United States Patent [19]

Takagi et al.

[11] Patent Number: 4,572,430
[45] Date of Patent: Feb. 25, 1986

[54] AIR CONDITIONER FOR VEHICULAR SEAT

[75] Inventors: Sadaaki Takagi, Okazaki; Shigetsugu Yura, Aichi; Masaki Fukuda, Okazaki, all of Japan

[73] Assignee: Takagi Chemicals, Inc., Okazaki, Japan

[21] Appl. No.: 624,971

[22] Filed: Jun. 27, 1984

[30] Foreign Application Priority Data

Aug. 17, 1983 [JP] Japan .................. 58-149107

[51] Int. Cl.⁴ ............................. G05D 23/00
[52] U.S. Cl. ....................... 237/2 A; 237/12.3 R; 237/12.3 A; 219/202; 236/49; 165/42
[58] Field of Search ............ 237/12.3 A, 12.3 B, 237/12.3 R, 2 A; 219/202; 98/2.05, 2.03; 236/49; 165/41, 42

[56] References Cited

FOREIGN PATENT DOCUMENTS

| | | |
|---|---|---|
| 670638 | 10/1965 | Belgium ................ 219/202 |
| 969738 | 7/1949 | Fed. Rep. of Germany ..... 237/12.3 A |
| 148449 | 10/1980 | Japan . |
| 90661 | 6/1982 | Japan . |
| 90662 | 6/1982 | Japan . |
| 90663 | 6/1982 | Japan . |
| 90664 | 6/1982 | Japan . |
| 142945 | 9/1982 | Japan . |
| 142946 | 9/1982 | Japan . |
| 146558 | 9/1982 | Japan . |

Primary Examiner—Henry Bennett
Attorney, Agent, or Firm—Gordon W. Hueschen

[57] ABSTRACT

An air conditioner for a vehicular seat, comprising a seat formed of a support frame and an air-pervious cushioning member resting on said support frame and provided within said cushioning member with an electric heater and in the lower part of said cushioning member with air supply means serving to pass air to said air-pervious cushioning member, an air conditioner, an air duct interconnecting said air conditioner and said air supply means, means for feeding electric power to said electric heater until the temperature of said cushioning member of said seat reaches a first preset level, and valve means capable of closing said air duct when the temperature of said cushioning member reaches a second preset level higher than said first preset level and opening said air duct when the temperature of said cushioning member falls below said second preset level.

8 Claims, 4 Drawing Figures

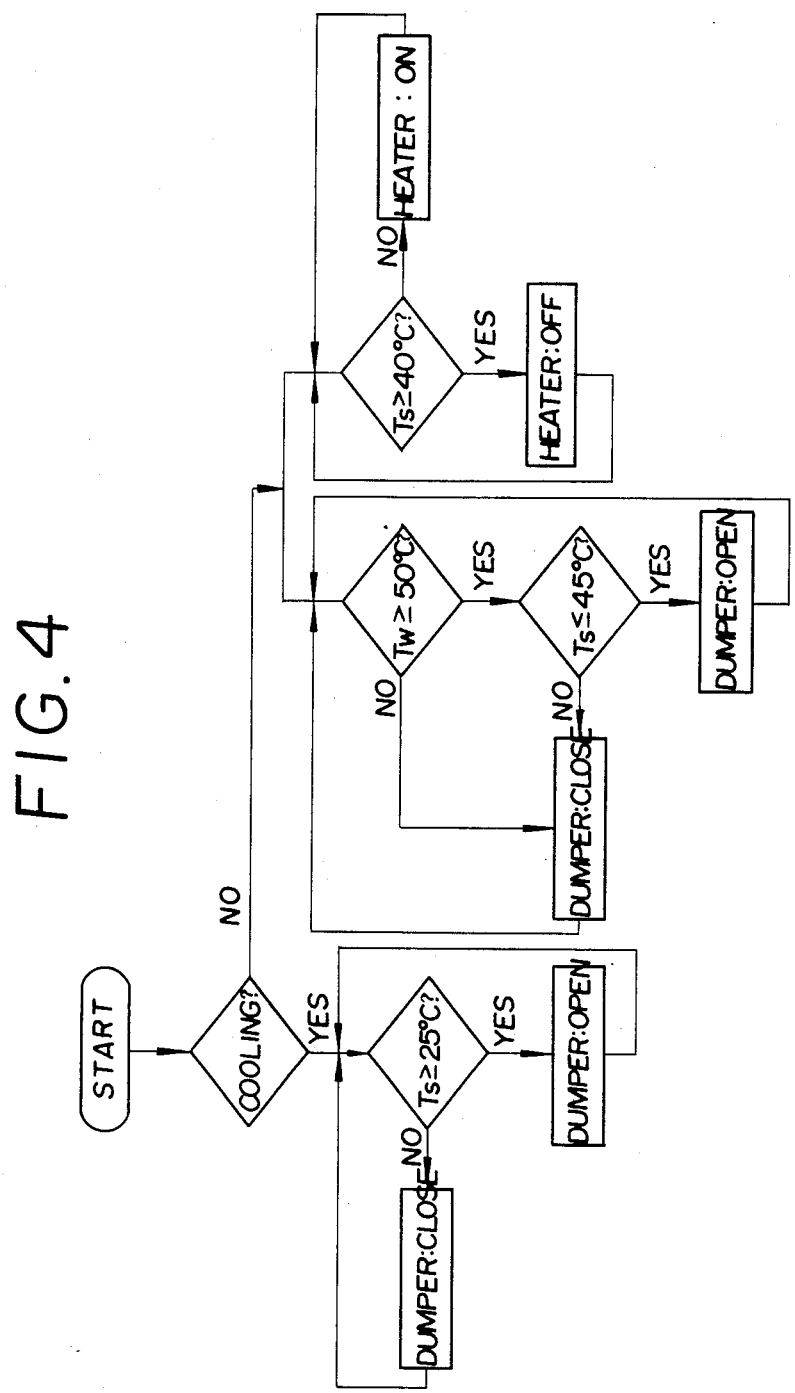

AIR CONDITIONER FOR VEHICULAR SEAT

BACKGROUND OF THE INVENTION

1. Field of the Invention:

This invention relates to an air conditioner for a vehicular seat.

2. Description of Prior Arts:

In a vehicle driven in a cold district or during the winter, since the temperature of the interior thereof is low, the interior or the seat is warmed to improve the comfort of ride. The warming of the seat, for example, is effected by using a heater connected to the vehicle's power source and embedded in the seat or by sending a current of warm air to the seat from an air heater suitably disposed in the interior.

When the heater connected to the vehicle's power source is used for the warming, however, it consumes a large volume of energy from the power source such as a car battery and proves uneconomical in spite of the advantage that the temperature of the heater is instantaneously elevated to bring the temperature of the seat quickly to the preset temperature when the switch is closed to turn on the heater.

The air heater is designed to warm air by making use of the heat of the engine cooling water. This air heater used for warming the seat, therefore, proves economical. It nevertheless suffers from the disadvantage that since the temperature of the engine cooling water is low during the initial stage of the engine operation and further since the elevation of the seat temperature by the current of warm air occurs with poor efficiency, the seat temperature is elevated at a low rate and requires much time before it reaches the predetermined level.

When the vehicle is driven in a hot district or during the summer, the interior thereof, particularly the seat installed therein, must be cooled for the sake of the comfort of ride.

To ensure preservation of good environment in automobile interiors, most automobiles have been provided with devices for cooling, warming or air conditioning their interior spaces. These devices are preponderantly air conditioners. Despite the use of such devices, in the vehicle driven in a hot district, the driver sitting on the seat perspires on the back and the hips so much as to spoil the comfort of ride no matter how much the space may be cooled and, in the vehicle driven in a cold district, the driver finds that the seat is so cold and it won't warm up readily no matter how much the space may be warmed.

One of the present inventors formerly developed a cushioning material high pervious to air (U.S. Pat. Nos. 4,172,174, 4,298,418 and 4,386,041 and U.S. Ser. No. 292,907). One of his inventions covering this cushioning material relates to a reinforced cushioning material comprising a compression molded body of drafted three-dimensionally crimped filament mass of a synthetic fiber in which the crimped filaments are of staple length and randomly-oriented and the contact points between each of the filaments are bonded with an adhesive, said body having isolated zones in which the crimped filament is further crimped in situ into various shapes formed by partially expanding and compressing the filament crimps in said zones, and said zones being distributed throughout the reinforced portion of said body, being oriented in the same direction, and having increased density in the degree of entanglement and the number of contact points.

By taking notice of the fact that this cushioning material, used in the vehicular seat, exhibits high perviousness to air, the inventor further developed a seat capable of being air conditioned with cool air or warm air introduced into the interior of the seat (Published unexamined Japanese Utility Model Application No. SHO 55(1980)-148,449, Nos. SHO 57(1982)-90,661 through 90,664, Nos. SHO 57(1982)-142,945 through 142,946 and No. SHO 57(1982)-146,558).

In average human beings, the body temperature is 37° C. and the skin temperature is 30° to 34° C. It is beyond at least 35° C., preferably at least 40° C. that warmth of the ambient air is perceived. When the temperature of the ambient air exceeds 50° C., however, hotness rather than warmth is perceived. In a hot district, it is below 25° C. that coolness is perceived. When the temperature of the ambient air falls below 10° C., however, biting cold rather than coolness is perceived possibly to the extent of adversely affecting the health. In a district of meteorologically cold weather, there are places where the temperature of the ambient air falls below minus 20° C. Under the condition, the system for warming the seat with the current of hot air from the air conditioner is ineffective until the engine is heated and consequently the engine cooling water is warmed to a level beyond at least 60° C., preferably near 80° C. Besides, the thermal energy is lost en route from the position the heat is collected to the position the heat is released. Thus, some tens of minutes' time is required for the temperature of the seat to be elevated from the level far below zero to the level of about 40° C. at which the seat is desired to be maintained during its actual service. From this particular point of view, therefore, the method which heats the seat directly with an electric heater much less susceptible of energy loss proves more advantageous in respect of quick manifestation of effect.

In a district of intense heat, a cooler incorporated in the air conditioning system enables the temperature of the seat and its immediate vicinity to be lowered to the comfortable level in a matter of several minutes (less than 5 minutes, for example) even under the worst condition, because this cooler starts sending forth cool air as soon as the switch is closed and because the difference between the prevalent ambient temperature and the comfortable seat temperature desired is not very large.

An object of this invention, therefore, is to provide a novel air conditioner for the vehicular seat.

Another object of this invention is to provide an economical air conditioner for the vehicular seat, economical in the sense that it is capable of enabling the temperature of the seat to be elevated quickly to the prescribed level and reducing power consumption.

SUMMARY OF THE INVENTION

The objects described above is accomplished by an air conditioner which comprises a seat formed of a support frame and an air-pervious cushioning member resting on the support frame and provided within the cushioning member with an electric heater and in the lower part of the cushioning member with air supply means serving to pass air to the air-pervious cushioning member, an air conditioner, an air duct interconnecting the air conditioner and the air supply means, means for feeding electric power to the electric heater until the temperature of the cushioning member of the seat reaches a first preset level, and valve means capable of closing the air duct when the temperature of the cushioning member reaches a second preset level higher than the first preset level and opening the air duct when the temperature of the cushioning member falls below the second preset level.

BRIEF DESCRIPTION OF THE DRAWINGS

FIG. 4 is a flow chart of the operation of the air conditioner of this invention.

PREFERRED EMBODIMENT OF THE INVENTION

Figure 1:
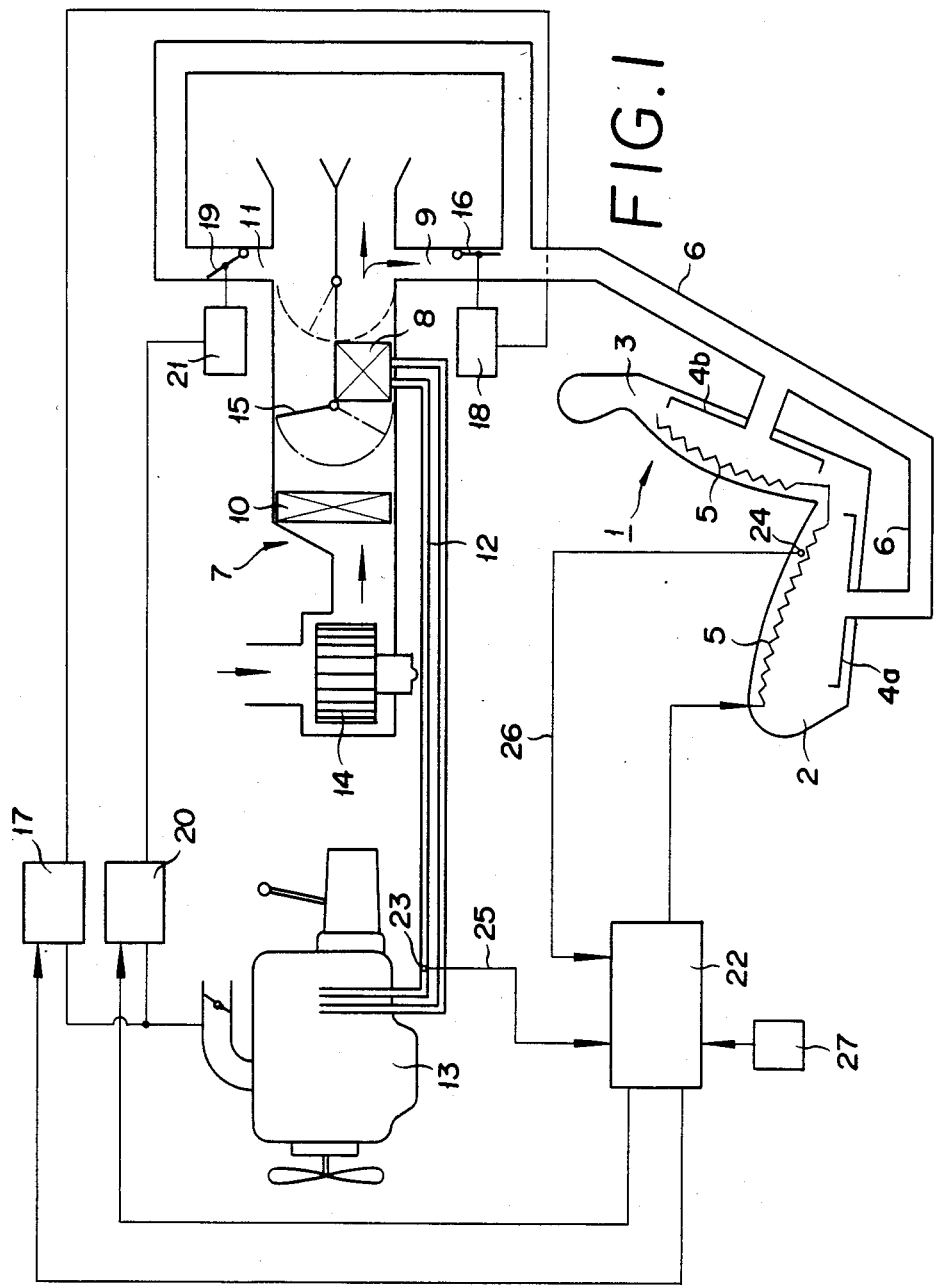
FIG. 1 is an overall explanatory diagram illustrating a typical air conditioner of this invention for the vehicular seat.

Now, one embodiment of this invention will be described below with reference to the accompanying drawings. FIG. 1 represents an overall explanatory diagram of the air conditioner of this invention for the vehicular seat. A seat 1 comprises a seat rest 2 and a back rest 3. These rests each comprises an air-pervious cushioning member mounted on a support frame and air feed means 4a, 4b disposed in the lower part of the cushioning member. The cushioning member is provided therein with an electric heater 5.

The aforementioned air feed means 4a, 4b communicate via an air duct 6 either with a hot air outlet 9 formed on the discharge side of a heater core 8 of an air conditioner 7 or with a cold air outlet 11 formed on the discharge side of an evaporator 10. The heater core 8 communicates via a water tube 12 with a cooling water circulation unit for an engine 13, so that the cooling water (in hot state) circulated through the engine 13 will be advanced through the water tube 12 to the heater core 8, there to heat the air being supplied from a fan 14, and the hot air thus produced will be advanced via the air duct 6 to the cushioning member of the seat 1. The hot air outlet 9 is provided with a first damper 16 adapted to be switched with a first diaphragm 18 which communicates with a first solenoid valve 17. To start cooling the interior, the circulation of the engine cooling water to the core heater 8 is stopped, a door 15 is opened, circulation of coolant to the evaporator is continued and, at the same time, the air from the fan 14 is passed through the evaporator 10 to be cooled therein, and cool air thus produced is discharged through the cold air outlet 11 and forwarded via the air duct 6 to the cushioning member of the seat 1. The cold air outlet 11 is provided with a second damper 19 adapted to be switched with a second diaphragm 21 which communicates with a second solenoid valve 20.

The solenoid valves 17, 20 are controlled with a controller 22. An engine cooling water temperature sensor 23 disposed in the water tube 12 and a seat temperature sensor 24 disposed inside the cushioning member are connected to the controller 22 respectively via lines 25, 26. The controller 22 receives the inputs on the cooling water temperature and the seat temperature. By the corresponding outputs of this controller 22, the solenoid valves 17, 20 are controlled and the supply of electric power from a power source 27 to the electric heater 5 is regulated.

Figure 2:
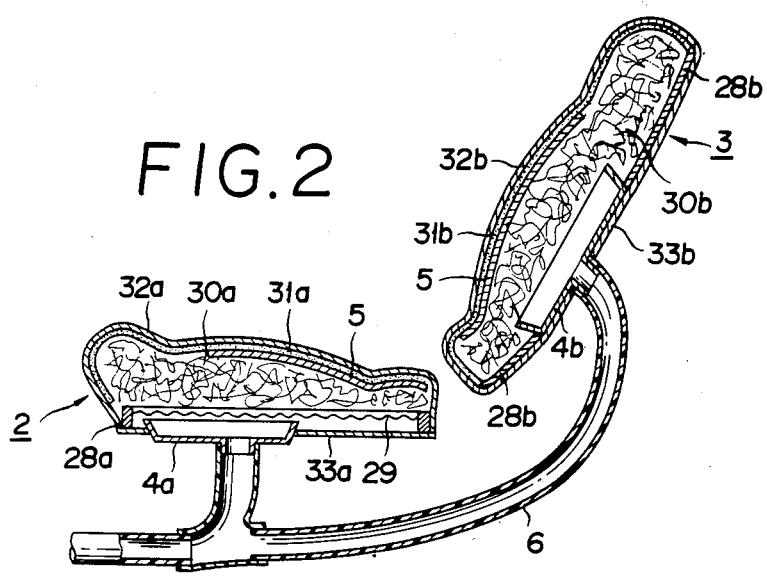
FIG. 2 is a cross section illustrating a typical vehicular seat in which the present invention is embodied.

The seat 1 to be used in this invention comprises a seat rest 2 and a back rest 3 as illustrated in FIG. 2, for example. The seat rest 2, which is mounted on a frame 28a, is formed of an air-pervious cushioning member 30a disposed on the frame 28a optionally through the medium of a spring 29 and an air-pervious wadding 31a such as of nonwoven fabric or open-cell polyethylene foam superposed on the cushioning member 30a. The electric heater is interposed between the wadding 31a and the cushioning member 30a. Further, the cushioning member 30a is covered with an air-pervious surface member 32a. The cushioning member 30a is provided in the lower portion thereof with the air feed means 4a such as, for example, an air dispersing device. The air feed means 4a communicates with the air duct 6. Similarly to the seat rest 2, the back rest 3 comprises an air-pervious cushioning member 30b mounted on a frame 28b and an air-pervious wadding 31b superposed on the cushioning member 30b. The electric heater is interposed between the wadding 31b and the cushioning member 30b. The cushioning member 30b is covered with a gas-pervious surface member 32b. The cushioning member 30b is provided in the lower portion thereof with the air feed means 4b such as, for example, an air dispersing device. This air feed means 4b is adapted to communicate with the air duct 6.

The air-pervious surface members 32a, 32b are made of woven fabric or knit fabric. The permeability of the member to air is required to exceed at least 100 $cm^3/cm^2/sec$ and desired to fall in the range of 200 to 1,000 $cm^3/cm^2/sec$. Optionally, the frames 28a, 28b may be coated with air-pervious, preferably air-impervious, surface members 33a, 33b.

The cushioning members may be made of any of the cushioning materials disclosed in U.S. Pat. Nos. 4,172,174, 4,298,418 and 4,386,041 and U.S. Ser. No. 292,907, represented by a reinforced cushioning material comprising a compression molded body of drafted three-dimensionally crimped filament mass of a synthetic fiber in which the crimped filaments are of staple length and randomly-oriented and the contact points between each of the filaments are bonded with an adhesive, said body having isolated zones in which the crimped filament is further crimped in situ into various shapes formed by partially expanding and compressing the filament crimps in said zones, and said zones being distributed throughout the reinforced portion of said body, being oriented in the same direction, and having increased density in the degree of entanglement and the number of contact points. The permeability of this cushioning material to air is required to fall in the range of 200 to 1,000 $cm^3/cm^2/sec$, preferably in the range of 400 to 800 $cm^3/cm^2/sec$.

For example, the cushioning member of the seat is obtained by molding in a stated shape a mass of crimped staple polyester monofilaments 350 denier in thickness, subjecting the molded mass to needling, immersing the needled molded mass in a bath of moisture-setting polyurethane adhesive agent (made by Think Chemical Industry Co., Ltd. and marketed under trademark designation of THINK BOND 1008-50C), removing it from the bath and allowing the adhering adhesive agent to drip off the mass, curing the wet mass under the pressure of steam of 1 $kg/cm^2$ at 100° C. for three minutes, and repeating the whole procedure once more. The bulk density of the cushioning member thus produced was 0.08 $g/cm^3$ in the cushion pad and 0.05 $g/cm^3$ in the back pad. The permeation to air was 400 cm³/cm²/sec in the cushion pad and 500 cm³/cm²/sec in the back pad. The overall amount of the adhesive agent deposited on the cushioning member was 40% by weight in both the pads. The cushioning material produced by the foregoing procedure was cut to the shape of the seat. The surface cloth is made of a material of particularly high permeability (about 100 to 150 cm³/cm²/sec) to air and it is underlain by a polyethylene foam sheet having extremely high permeability (about 300 to 500 cm³/cm²/sec) to air and a thickness of 10 mm.

Generally, a heater sheet is used as the electric heater. The heater units used in the heater seat may be of either the heater wire type or the type having a metallic coating deposited on the surface of fabric. Examples of the heater wire type are (1) a single-ply sheathed spiral heater about 1.2 mm in outside diameter, obtained by spirally winding a polyester core yarn around a heating wire 0.08 to 0.1 mm in thickness and 0.4 to 0.7 mm in width and covering the spiral winding with polyvinyl chloride, (2) a two-ply sheathed spiral heater about 1.2 mm in outside diameter, obtained by spirally winding a polyester core yarn around a heating wire (CuAg wire or CuAl wire) about 0.08 mm in thickness and 0.2 to 0.4 mm in width, covering the spiral winding with polyamide, and further covering the polyamide layer with polyvinyl chloride, and (3) Teflon heater about 0.73 to 0.86 mm in outside diameter, obtained by coating a bundle of several heating wires (soft copper wires or CuN wires) 0.08 to 0.12 mm in diameter with fluorine resin. A typical example of the fabric type is Metallized Fabric made by Bayer AG of West Germany.

Figure 3:
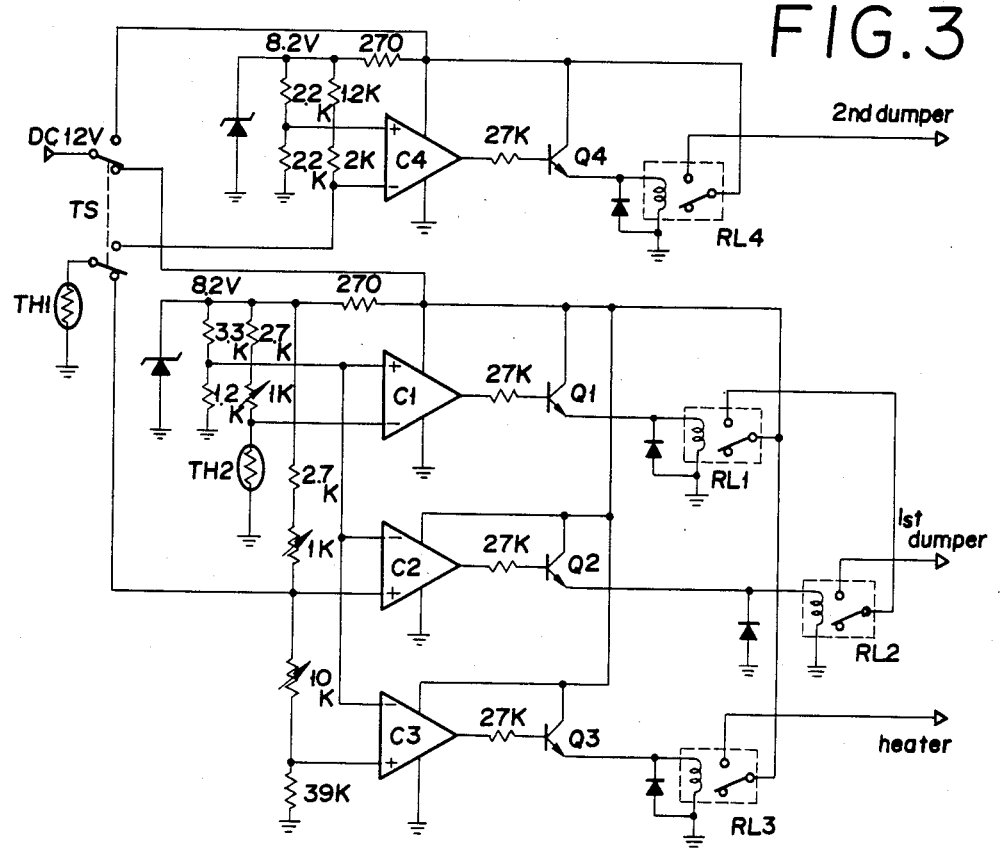
FIG. 3 is a diagram of an electronic circuit for a controller to be used in the present invention.

The controller to be used in the present invention, as illustrated in FIG. 3, for example, is divided into two circuits, namely a cooling circuit which comprises of a comparator C4, a relay drive transistor Q4 and a second damper drive ralay RL4, and a warming circuit which comprises of a comparator C1, a relay drive transistor Q1, a relay RL1 for feeding electric power to a first damper drive relay RL2, a comparator C2, a relay drive transistor Q2, a comparator C3, a relay drive transistor Q2 and a relay RL3 for feeding electric power to the heater. These two circuits are switched one to the other with a toggle switch TS. Thermistors are used as the temperature detectors. The thermistor TH2 for detection of water temperature is used exclusively during the control of warmth. The thermistor TH1 for detection of seat temperature is used both during the control of coolness and that of warmth. During the control of coolness, therefore, the latter thermistor is connected to the inverting input of the comparator C4 during the control of warmth and to the non-inverting input of the comparator C2 during the control of coolness, both with the aforementioned toggle switch TS. (To either of the two inputs of each of the comparators, the standard voltage as divided by the zener diode ZD1 or ZD2 and the resistance is applied. To the other input, the voltage divided by the thermistor and the resistor connected serially to the thermistor is applied. The inverting voltage of each of the comparators and consequently the detecting temperature are determined by the resistor connected serially to the thermistor. The detecting temperatures of the comparators C1, C2, C3 and C4 are fixed respectively at 40° C., 45° C., 50° C. and 25° C., for example.)

Now, the operation of the circuits will be specifically described below. First, as the toggle switch TS is turned on toward the coolness control side, only the circuit for the control of coolness is put to work and the circuit for the control of warmth is kept in its nonoperative state and the outputs to the heater and the first damper are turned off. When the temperature falls below 25° C., no electric power is supplied to the second damper because the output of the comparator C4 is suspended and the relay RL4 remains in its inoperative state. As the temperature exceeds 25° C., the output of the comparator C4 becomes alive and the relay RL4 is actuated, with the result that the second solenoid valve 20 operates to actuate the second diaphragm 21 and open the second damper 19 and start feeding cool air to the seat 1. When the temperature of the seat 1 is lowered below 25° C., the output of the comparator C4 is shut off and the second damper 19 is closed.

When the switch TS is turned on toward the warmth control side, the circuit for the control warmth is set into action. At this time, the circuit for the control of coolness is set into the inoperative state, the output of the relay RL4 is discontinued, and the second damper 19 is set to its closed state. In the circuit for the control of warmth, two controls continuously (not sequentially) proceeds independently of each other. One of the controls is for switching the heater 5 and the other for switching the first damper 16.

First, the control of the switching of the heater 5 will be described. When the temperature of the seat is below 40° C., the output of the comparator C3 is alive and the relay RS3 is actuated and the power is supplied to the heater 5. As the temperature rises beyond 40° C., the heater is shut off because the output of the comparator C3 is not alive and the relay RL3 is set to its inoperative state. In the meantime, when the temperature of the cooling water rises beyond 50° C., the comparator C1 is turned on and the relay RL1 starts feeding power to the relay RL2. If, in this case, the temperature of the seat is below 45° C., then the output of the comparator C2 is turned off and the relay RL2 is set to its inoperative state. Consequently, no power is fed to the first solenoid valve 17 which serves to actuate the first diaphragm 18 interlocked with the first damper 16. If the temperature of the seat falls below 45° C., the output of the comparator C2 is turned on and the relay RL2 is actuated to open the first damper 16, with the result that warm air will be fed to the seat. When the water temperature falls below 50° C., the output of the comparator C1 is turned off and the relay RL1 fails to function. Consequently, the first damper 16 remains in its closed state without reference to the seat temperature because no power is supplied to the first solenoid valve 17 which actuates the first damper 16.

The operation described above is depicted in terms of flow chart in FIG. 4.

In the embodiment described above, the controller has a circuit configuration as illustrated in FIG. 3. This circuit configuration is an illustrative and not limitative example. The circuit may be configured in any way insofar as it is capable of providing the aforementioned control. Optionally, a microcomputer may be utilized for the purpose of the control.

In the preceding embodiment, the water temperature sensor 23 is provided in the water pipe 12. Otherwise, a temperature sensor may be provided in the air duct 6 and the control of the first damper 6 may be effected by the temperature of the warm air.

The preceding embodiment has been described as applied to an air conditioner for warming and cooling the vehicular interior. For the embodiment of this invention exclusively in an air heater, the portion of the air conditioner serving the purpose of cooling the space may be omitted. The remaining heater serves the purpose of warming sufficiently.

As described above, the present invention is directed to providing an air conditioner for a vehicular seat, comprising a seat formed of a support frame and an air-pervious cushioning member resting on the support frame and provided within the cushioning member with an electric heater and in the lower part of the cushioning member with air supply means serving to pass air to the air-pervious cushioning member, an air conditioner, an air duct interconnecting the air conditioner and the air supply means, means for feeding electric power to the electric heater until the temperature of the cushioning member of the seat reaches a first preset level (for example, 30° to 48° C., desirably 35° to 45° C., and preferably about 40° C.), means for continuing supply of electric power to the electric heater until the temperature of the cushioning member reaches the first preset level, and valve means capable of closing the air duct when the temperature of the cushioning member reaches a second preset level (for example, 40° to 60° C., desirably 45° to 55° C., and preferably about 50° C.) higher than the first preset level and opening the air duct when the temperature of the cushioning member falls below the second preset level. The seat is heated with the electric heater until the temperature thereof reaches the first preset level and, after reaching the first preset level, is heated with the current of warm air supplied by the air duct until the temperature thereof reaches the second preset level. Thus, the temperature of the seat is quickly elevated during the initial stage of space heating, and, therefore, elevated to the second preset level only with the heat of the current of warm air. This invention, therefore, enables the seat temperature to be quickly elevated to the preset level while ensuring economic use of the energy from the power source. This invention has originated in the concept of initially elevating the seat temperature quickly to the desired level (for example, 20° to 35° C.) and thereafter maintaining the level constant, and it has succeeded in overcoming the problem of energy loss due to electric heating and efficiently utilizing the heat of engine for maintenance of the elevated temperature by the combination of the air conditioner and the electric heater.

What is claimed is:

1. An air conditioner for a vehicular seat, comprising a seat formed of a support frame and an air-pervious cushioning member resting on said support frame and provided within said cushioning member with an electric heater and in the lower part of said cushioning member with air supply means serving to pass air to and through said air-pervious cushioning member, an air heater, an air duct interconnecting said air heater and said air supply means, means for feeding electric power to said electric heater until the temperature of said cushioning member of said seat reaches a first preset level, and valve means operative to close said air duct when the temperature of said cushioning member reaches a second preset level higher than said first preset level and to open said air duct when the temperature of said cushioning member falls below said second preset level.

2. An air conditioner according to claim 1, wherein the air in said air heater is heated by circulation of engine cooling water.

3. An air conditioner according to claim 2, wherein said first preset temeprature is in the range of 30° to 48° C.

4. An air conditioner according to claim 2, wherein said second preset temperature is in the range of 40° to 60° C.

5. An air conditioner according to claim 1, wherein said electric heater is a heater sheet.

6. An air conditioner according to claim 1, wherein said air-pervious cushioning member has permeability to air in the air in the range of 200 to 1,000 $cm^3/cm^2/sec$.

7. An air conditioner according to claim 1, which further comprises an air cooler having means to supply cooled air to said air supply means and cooled air valve means operated to start the flow of cooled air when the temperature of the cushion member reaches said second preset level and to stop the flow of the same when it falls below said second preset level.

8. An air conditioner according to claim 5, which further comprises an air permeable cover for said cushioning member, an air permeable foam liner between said cover and said cushioning member and wherein said heater sheet is disposed between said cushioning member and said foam liner.

* * * * *